Patented Dec. 9, 1952

2,621,134

UNITED STATES PATENT OFFICE 2,621,134

METHOD OF DEPOSITING LUMINESCENT POWDERED MATERIAL ON SURFACES BY SEDIMENTATION

Eric Edward Welch, Kenton, England, assignor to The General Electric Company Limited, London, England No Drawing. Application April 8, 1950, Serial No. 154,885. In Great Britain April 12, 1949

20 Claims. (Cl. 117—33.5)

This invention relates to a method of forming adherent layers of powdered materials on surfaces, and more particularly to the deposition, by a sedimentation process, of a layer of a powder which is insoluble, or only slightly soluble, in water, from a suspension of the powder in an aqueous liquid.

One well known sedimentation process for forming an adherent layer, of substantially uniform thickness, of a powdered material on a surface, such as a vitreous or metallic surface, comprises allowing a suspension of the powder in water or a suitable aqueous solution to stand in contact with the surface to be coated for a sufficient length of time for all the suspended powder to settle on to the surface under the influence of gravity, and then removing the suspending liquid. Such a process may advantageously be used for depositing layers of luminescent powders on the envelopes, or parts thereof, of electric discharge devices for the production of fluorescent screens, for example it may be used for the manufacture of the fluorescent screens of cathode ray tubes.

In depositing layers of powdered materials on surfaces by such sedimentation methods difficulties frequently arise in obtaining layers of satisfactory uniform thickness and adherence, and various additives to the aqueous suspending medium have been proposed in order to improve these properties. Thus it is known that the addition of a small quantity of an electrolyte to the water assists in producing a layer of substantially uniform thickness, and the addition of very small quantities of certain inorganic compounds which form gelatinous precipitates, including silica, silicates, and some metallic hydroxides and basic carbonates, has been proposed, such compounds functioning as binders and thus increasing the adherence of the layer after removal of the settling liquid.

However, in most of the methods previously proposed, it has been found that, in order to ensure that the deposited layer remains undisturbed when the supernatant liquid is poured off, it is necessary to allow the liquid to stand over the deposited layer for a considerable length of time, the total settling time usually being of the order of four to eight hours.

It is the object of this invention to provide a sedimentation method of depositing an adherent layer on a surface wherein the settling time can be reduced.

According to the present invention, in a method of forming upon a surface an adherent layer of powdered material which is insoluble, or only slightly soluble, in water, by sedimentation from a suspension of the powder in an aqueous liquid, a water-soluble alginate is included in the suspending liquid.

The liquid may be employed for the deposition of a single powdered substance or a mixture of powders, and is especially applicable to the formation of adherent layers of inorganic powders in the manufacture of fluorescent screens for electric discharge devices such as, for example, the fluorescent screens of cathode ray tubes. The process of the invention may also be used for the deposition of non-luminescent additive powdered materials in the manufacture of fluorescent screens, for example for the deposition of materials of high secondary electron emission coefficient such as magnesium oxide.

Surfaces on which layers of powder may be formed by the method of the invention include surfaces of glass and other vitreous materials, mica, metals which do not react adversely with the alginate solution under the conditions of the process, and glass or other surfaces wholly or partly coated with a film of such a non-reactive metal. Advantageously the surface consists of or contains a substance which is capable of reacting with the water-soluble alginate to produce a thin surface film of a gelatinous alginate precipitate. Thus the glass end wall of the envelope of a cathode ray tube forms a suitable base for the application of an adherent layer of powder by the method of the invention, whether or not its interior surface is provided with a conductive layer such as a film of silver. It is believed that, in such cases either the calcium in the glass or the silver film is capable of reacting with the alginate solution to form a surface film of gelatinous calcium alginate or silver alginate respectively.

Preferably, in order to obtain a layer of uniform thickness, there is added to the suspending liquid in addition to the soluble alginate a small proportion of one or more electrolytes which may in general consist of any organic or inorganic compounds which do not react with the alginate to give an insoluble compound. Electrolytes which may be used include, for example, ammonium salts such as ammonium chloride or ammonium sulphate and magnesium salts, particularly the chloride, sulphate and nitrate. In my experience the quantity of electrolyte required to ensure uniformity of the layer is somewhat greater than that generally required in known methods in which no alginate is employed. The actual optimum concentration depends upon the nature of the electrolyte and therefore varies with different electrolytes. Care should be taken, however, to avoid using an amount of electrolyte in excess of that which is required to give a layer of uniform thickness, since poor adherence of the layer may result from the presence of excess electrolyte. I have found, for example, that when the liquid contains an alginate in accordance with the present invention and when the electrolyte used is magnesium chloride, magnesium nitrate, or ammonium chloride, the concentration of the electrolyte in the suspension for obtaining the best results should be at least 5 millimols per litre and is preferably about 10 millimols per litre, while in the case of magnesium sulphate, a concentration of about 20 millimols per litre is preferred. The amount of electrolyte required will depend, however, to some extent on the powder to be deposited, since slightly soluble powders will provide ions in the suspending liquid.

The preferred alginate for use in the method according to the invention is ammonium alginate, but other water-soluble alginates, for example the alginates of the alkali metals, sodium, potassium and lithium, magnesium alginate and triethanolamine alginate (sold under the trade name "Manucol T") may sometimes be used. The water-soluble alginates are obtainable in different degrees of polymerisation, and the concentration of alginate which may be required to be used in carrying out the method of the invention will depend to some extent on the degree of polymerisation of the particular alginate used. For example, I have found that when using a highly polymerised ammonium alginate such that an aqueous solution containing 1% by weight of the dry material has a viscosity of approximately 110 centistokes at a temperature of 25° C., the concentration of the alginate in the suspending liquid is preferably not less than 50 mgms. per litre, and that the viscosity of the suspending liquid appears to become undesirably high if the alginate concentration is increased much above 2.5 gms. per litre; the optimum concentration depends also to some extent on the subsequent treatment to which the deposited layer of powder is to be subjected, as will be explained more fully hereinafter.

The functions of the soluble alginate in the suspending liquid include those of a dispersing agent and wetting agent, and the alginate also has the particularly advantageous property of functioning as an efficient binder when in the wet condition, which property is believed to be due mainly to the formation of gelatinous alginate films as aforesaid either on the surfaces of the powder particles or on the surface to be coated or on both. The deposited layer of powder is then caused to adhere strongly to the glass or other surface while it is still covered by the suspending liquid, and this effect makes possible a substantial reduction in the settling time as compared with previously known methods. Thus I have found that when a luminescent powder is introduced into a suspending liquid containing suitable concentrations of ammonium alginate and a suitable electrolyte, such as magnesium chloride or ammonium chloride, the particles of powder adhere to the surface as soon as they touch it, even at those parts of the surface which are in an almost vertical position and that the adhesion of the powder layer to the surface improves rapidly with the passage of time and in one or two hours is sufficient to allow the supernatant liquid to be removed. The initial adhesion of the particles to the surface appears to be due principally to the presence of the electrolyte, but the rapid growth in the strength of the adhesion is due principally to the binding action of the alginate.

As indicated above, in determining the most suitable concentration of water-soluble alginate to be employed in any particular case it is necessary to take into consideration the possible effect of any treatment to which the layer of powder is to be subjected subsequently to its deposition. For example, if a powder layer is to be subjected next to a treatment involving washing with water, such as aluminising by the well-known water pool technique, it is necessary to ensure that sufficient alginate is retained in the powder layer to impart to the layer sufficiently strong adherence, as a result of the binding action of the gelatinous alginate film and of the deposited soluble alginate in addition to the molecular forces inherent in the powder, to prevent disturbance of the particles during the washing. This result may be achieved by employing a relatively high concentration of the alginate in the suspending liquid; for example, I have found that for the preparation of the fluorescent screens of cathode ray tubes for use in television reception, radar oscilloscopes or like purposes, the optimum concentration of the alginate (when the alginate used is the highly polymerised ammonium alginate referred to above) is about 500 mgms. per litre of the suspending liquid. Alternatively the adherence of the powder during subsequent washing treatments may be safeguarded by the application of a permanent over-binder, for example tetraethyl orthosilicate, and subsequent baking at a suitable temperature, usually 350° C. to 450° C. In some cases it is found that the step of baking the deposited layer of powder at such a temperature is adequate, even in the absence of such an overbinder, to stabilise the adherence of the powder layer sufficiently. When using either of these methods involving baking, a considerably smaller concentration of the alginate may be used, 50 mgms. per litre usually being sufficient, while in some cases concentrations as low as 30 mgms. per litre are adequate. If however the powder layer is not to be subjected to a washing treatment the concentration of alginate is far less critical, it being preferred, in general, to use relatively low concentrations, for example, of the order of 50 mgms. per litre.

Luminescent powders and additives which may be applied to surfaces by the method of the invention include, for example, sulphides such as silver-activated zinc sulphide and silver-activated zinc cadmium sulphide, separately or in admixture, and phosphorus-activated zinc sulphide, and oxides such as zinc oxide and magnesium oxide. The particles of which the powders consist should not be much larger in diameter than $30\mu$ and preferably range from $5\mu$ to $30\mu$ equivalent diameter though particles of diameter less than $5\mu$ may also be present, the mean diameter for a mass of powder being suitably between $15\mu$ and $20\mu$. It may be noted that by using the method according to the invention adherent layers may be formed with powders consisting of coarser particles than those usually employed with satisfactory results in known sedimentation processes.

In the preferred form of the method according to the invention a viscous standard solution of a soluble alginate such as ammonium alginate is first prepared and is clarified by being allowed to settle for a considerable length of time, usually some weeks, and then syphoning off the relatively clear liquid, or by centrifuging or by filtering under pressure. This standard solution is employed in the preparation of both a settling liquid, which comprises an aqueous solution of a suitable electrolyte to which the required amount of the standard alginate solution is added, and a concentrated suspension of the powder or powders to be deposited.

To prepare the concentrated suspension a quantity of the standard alginate solution is diluted with water and the powder is wetted with a portion of the resulting solution by any of the usual methods, for example, by milling in a ball mill, by shaking on a high speed shaker, or by mixing with a high speed stirrer. The wetted powder is then added to the diluted alginate solution in an amount to give a suspension of a convenient concentration, for example, between about 10 gms. per litre and about 100 gms. per litre, the preferred concentration in the case of highly polymerised ammonium alginate being about 30 gms. per litre.

In a modification of the preferred method of the invention the concentrated suspension of the powder may be made up in a liquid containing instead of a soluble alginate a suitable dispersing agent such as, for example, blood serum at a concentration of 0.1 gm. per litre, or trisodium phosphate at a concentration between 10 mgms. per litre and 100 mgms. per litre. In this case the standard alginate solution is incorporated only in the settling liquid.

As a further alternative, in some cases the use of a dispersing agent in the concentrated suspension may be dispensed with altogether, the powder or powders being suspended in pure water.

With some powders it is desirable after preparing the concentrated suspension as described above to allow the powder to form a sediment and then to remove the suspending liquid, replacing it with further liquid which is again mixed with the powder. The object of this procedure is to remove from the powder soluble material which might have an adverse effect on the ultimate formation of the adherent layer of the powder.

The surface on which the powder layer is to be formed is cleaned thoroughly by washing with alkali and/or other suitable reagents and finally with water, preferably distilled. Then, in the preferred method of carrying out the invention, the freshly cleaned surface is first covered to a suitable depth, for example about one inch, with the settling liquid, and the desired amount of the concentrated suspension of the powder is then introduced into the settling liquid in any suitable known manner, for example by injecting it through a perforated nozzle.

At the end of the required settling period, the supernatant liquid is removed from the coated surface by any convenient method, for example by decanting, draining or siphoning. In the case of cathode ray tubes, decanting is the preferred method, and may be effected by slowly tipping the tube by known mechanical means, the rate of tipping being adjusted so as to avoid the formation of channels in the layer of powder by the washing action of residual drops of liquid. After removal of the liquid the coated surface may be allowed to drain for a few minutes and then dried by passing a current of warm air over it.

A modification of the method of the invention which is particularly desirable when a high concentration of the alginate is used and when the powder layer is to be subjected to a prolonged soaking in water consists in the washing of the dried powder layer with an aqueous solution of a calcium salt such as calcium chloride or calcium nitrate in half molar concentration, or of an acid which does not attack the powder and which reacts with alginates to liberate alginic acid, for example, very dilute hydrochloric acid. The object of such an addition is to prevent the alginate film or the deposited water-soluble alginate from re-dissolving during the aforesaid soaking in water.

Before further processing of the cathode ray tube, whether or not the washing step described in the preceding paragraph has been employed, it is advantageous to wash the dried screen with warm distilled water, for example at 40° C. to remove soluble material, such as residual electrolyte, which might have an adverse effect on the luminescent properties of the screen.

The method of the present invention may be employed not only for the deposition of a single layer of powder on a surface but, in common with many other sedimentation methods, may also be employed for the deposition of two or more layers consecutively on the same surface, for example in the production of double or triple layer fluorescent screens.

Two methods, in accordance with the invention, of producing a fluorescent screen on the interior surface of the closed end of the glass bulb portion of a cathode ray tube envelope, for use, for example, in television, will now be described by way of example.

*Example 1*

The soluble alginate employed in this example is commercial ammonium alginate of a highly polymerised grade such that an aqueous solution containing 1% by weight of the dried material has a viscosity of approximately 110 centistokes at a temperature of 25° C. The material as obtained commercially contains 15% to 20% by weight of water.

The interior of the cathode ray tube envelope is washed successively with 5% hydrofluoric acid, water, a 20% solution of caustic soda, and finally with distilled water.

A standard solution of ammonium alginate is prepared by dissolving 10 gms. of the above-described commercial ammonium alginate in distilled water, adding a small quantity of thymol to prevent attack by bacteria, and making up the solution to a litre with water. The solution is clarified by settling out in a constant temperature enclosure, maintained at 30° C., for two weeks.

The luminescent powder employed consists of a mixture of zinc sulphide and zinc-cadmium sulphide, both activated with silver, of particle size ranging from $5\mu$ to $30\mu$ diameter. A suspension of this powder is prepared by mixing with a litre of water 10 ml. of a standard 10 gms./litre solution of trisodium phosphate, wetting 30 gms. of the powder with some of this solution by light milling for about 10 minutes in a ball mill, and mixing the wetted powder with the remainder of the solution to give a suspension of concentration 30 gms. per litre.

For the settling liquid, an aqueous solution containing, per litre, 2 gms. of magnesium chloride, MgCl$_2$.6H$_2$O, and 50 mls. of the standard 10 gms./litre solution of ammonium alginate is prepared and filtered to ensure that it is clear.

For the formation of a 9 inch diameter fluorescent screen, 1000 ml. of the settling liquid is poured into the cathode ray tube envelope immediately after the latter has been cleaned as described above, the liquid covering the closed end of the bulb portion of the envelope which forms the base for the fluorescent screen and which is in a horizontal position, the axis of the tube being arranged vertically. 30 ml. of the 30 gms./litre suspension of the luminescent powder is then introduced into the tube by injection through a sprinkler nozzle directed towards the settling liquid. The powder settles through the liquid and in about 10 minutes forms a sediment adhering to the glass surface of the bulb.

One hour after the formation of this sediment the removal of the liquid by decantation is commenced, the tube being tilted by mechanical means at an angular velocity of 15° per minute. When all the liquid has thus been poured off, the tube is allowed to drain for a few minutes, and then the interior of the tube, including the adherent layer of luminescent powder, is dried by blowing warm air into it. The dried powder layer is washed first with a half-molar aqueous calcium chloride solution and is finally washed with distilled water at about 40° C., and is then ready for any further processing required for the manufacture of the cathode ray tube.

*Example 2*

The method is carried out in a similar manner to the method described in Example 1 with the exception that the settling liquid contains only 5 mls. per litre of the standard 10 gms. per litre solution of ammonium alginate.

After the powder layer has been deposited and dried as described in Example 1 it is treated with a 3% solution in alcohol of tetraethyl orthosilicate and is baked for 5 minutes at a temperature of 350° C. to 450° C., the actual baking temperature depending on the softening point of the glass of which the cathode ray tube envelope is formed.

The method described in either of the above examples may be modified by using, instead of the magnesium chloride referred to, ammonium chloride at a concentration of about 0.5 gms. per litre, and by omitting the use of trisodium phosphate as a dispersing agent, the concentrated suspension of the powder being prepared in distilled water alone or in an aqueous solution containing 0.1 gm. per litre of ammonium alginate.

I claim:

1. A method of manufacturing a cathode ray tube comprising a luminescent screen on a glass end wall of the tube envelope, wherein the said screen is formed upon the interior surface of the said glass end wall by a method which comprises the steps of washing the said surface successively with 5% hydrofluoric acid, water, 20% caustic soda and distilled water, immediately covering the said surface to a depth of about one inch with a first aqueous liquid containing highly polymerised ammonium alginate, such that an aqueous solution containing 1% by weight of the dried ammonium alginate has a viscosity of approximately 110 centistokes at a temperature of 25° C., at a concentration of 50 milligrams per litre and magnesium chloride at a concentration of 5 to 10 millimols per litre, introducing into said liquid a suspension of 30 grams per litre of powdered crystalline inorganic luminescent material of particle size 5$\mu$ to 30$\mu$ equivalent diameter in a second aqueous liquid containing the said highly polymerised ammonium alginate at a concentration of 100 milligrams per litre, the volume of said suspension used being 30 mls. for every 1000 mls. of said first aqueous liquid, allowing the resulting suspension to settle for one hour for deposition of a layer of the powdered luminescent material on said surface, removing the supernatant suspending liquid by slow decantation, drying the deposited layer of powdered material by means of a stream of warm air, washing the dried layer with a half-molar aqueous solution of calcium chloride, washing the said layer with distilled water at a temperature of about 40° C. again drying the said layer, treating the said dried layer with a 3% solution in alcohol of tetraethyl orthosilicate, and baking the treated layer for 5 minutes at a temperature of 350° C. to 450° C.

2. A method of forming upon a glass surface a luminescent screen composed of crystalline inorganic luminescent powder which is substantially insoluble in water and which consists substantially of particles not larger than 30 microns in diameter, which method comprises the steps of depositing a layer of said powder upon said surface by sedimentation from a suspension of the powder in an aqueous suspending liquid containing in solution a water-soluble alginate in a concentration between 30 milligrams and 2.5 grams per litre of the suspending liquid, removing the supernatant suspending liquid from the deposited layer of luminescent powder, and drying the said layer.

3. A method according to claim 2 wherein the said water-soluble alginate is ammonium alginate.

4. A method according to claim 3 wherein the the ammonium alginate is of a highly polymerised grade such that an aqueous solution containing 1% by weight of the dried ammonium alginate has a viscosity of approximately 110 centistokes at a temperature of 25° C.

5. A method of forming upon a glass surface a luminescent screen composed of crystalline inorganic luminescent powder which is substantially insoluble in water and which consists substantially of particles not larger than 30 microns in diameter, which method comprises the steps of depositing a layer of said powder upon said surface by sedimentation from a suspension of the powder in an aqueous suspending liquid containing in solution a water-soluble alginate in a concentration between 30 milligrams and 2.5 grams per litre of the suspending liquid, and containing also at least one electrolyte which is incapable of reacting with the alginate to produce a compound insoluble in water, said electrolyte being present in a concentration of 5 to 20 millimols per litre of the suspending liquid, removing the supernatant suspending liquid from the deposited layer of luminescent powder, and drying the said layer.

6. A method according to claim 5 wherein the said electrolyte is a member of the group consisting of magnesium chloride, magnesium nitrate and magnesium sulphate.

7. A method according to claim 5 wherein the said electrolyte is ammonium chloride and is used in a concentration of 5 to 10 millimols per litre of the suspending liquid.

8. A method of forming upon a glass surface a luminescent screen composed of crystalline inorganic luminescent powder which is substantially insoluble in water and which consists substantially of particles not larger than 30 microns in diameter, which method comprises the steps of depositing a layer of said powder upon said surface by sedimentation from a suspension of the powder in an aqueous suspending liquid containing in solution, in a concentration of 500 milligrams per litre of the suspending liquid, an ammonium alginate of highly polymerised grade such that an aqueous solution containing 1% by weight of the dried ammonium alginate has a viscosity of approximately 110 centistokes at a temperature of 25° C., and containing ammonium chloride in a concentration of 5 to 10 millimols per litre of the suspending liquid, removing the supernatant suspending liquid from the deposited layer of luminescent powder, and drying the said layer.

9. A method of forming upon a glass surface a luminescent screen composed of crystalline inorganic luminescent powder which is substantially insoluble in water and which consists substantially of particles not larger than 30 microns in diameter, which method comprises the steps of depositing a layer of said powder upon said surface by sedimentation from a suspension of the powder in an aqueous suspending liquid containing 30 to 50 milligrams per litre of ammonium alginate of a highly polymerised grade such that an aqueous solution containing 1% by weight of the dried ammonium alginate has a viscosity of approximately 110 centistokes at 25° C., and containing also at least one electrolyte which is incapable of reacting with the alginate to produce a compound insoluble in water, said electrolyte being present in a concentration of 5 to 20 millimols per litre of the suspending liquid, removing the supernatant suspending liquid from the deposited layer of luminescent powder, drying the said layer, and baking the said layer at a temperature of 350° C. to 450° C.

10. A method of forming upon a glass surface a luminescent screen composed of crystalline inorganic luminescent powder which is substantially insoluble in water and which consists substantially of particles not larger than 30 microns in diameter, which method comprises the steps of depositing a layer of said powder upon said surface by sedimentation from a suspension of the powder in an aqueous suspending liquid containing 30 to 50 milligrams per litre of ammonium alginate of a highly polymerised grade such that an aqueous solution containing 1% by weight of the dried ammonium alginate has a viscosity of approximately 110 centistokes at a temperature of 25° C., and containing also at least one electrolyte which is incapable of reacting with the alginate to produce a compound insoluble in water, said electrolyte being present in a concentration of 5 to 20 millimols per litre of the suspending liquid, removing the supernatant suspending liquid from the deposited layer of luminescent powder, drying the said layer, coating the said dried layer with tetraethyl orthosilicate and baking the said layer at a temperature of 350° C. to 450° C.

11. A method of forming upon a glass surface a luminescent screen composed of crystalline inorganic luminescent powder which is substantially insoluble in water and which consists substantially of particles not larger than 30 microns in diameter, which method comprises the steps of washing the said surface with alkali and then with distilled water, immediately covering the said surface to a depth of the order of one inch with a first aqueous liquid containing a water-soluble alginate, in a concentration between 30 milligrams and 2.5 grams per litre of the suspending liquid, and at least one electrolyte which is incapable of reacting with the alginate to produce a compound insoluble in water, said electrolyte being present in a concentration of 5 to 20 millimols per litre of the suspending liquid, introducing into said liquid a concentrated suspension of said luminescent powder at a concentration between 10 and 100 gms. per litre in a second aqueous liquid, allowing the resulting suspension to settle for one to two hours for the deposition of a layer of the luminescent powder on to the said surface, removing the supernatant suspending liquid from the deposited layer of luminescent powder, and drying the said layer.

12. A method according to claim 11 wherein the said luminescent powder consists of particles ranging from 5 microns to 30 microns equivalent diameter.

13. A method of forming upon a glass surface a luminescent screen composed of crystalline inorganic luminescent powder which is substantially insoluble in water and which consists substantially of particles not larger than 30 microns in diameter, which method comprises the steps of washing the said surface with alkali and then with distilled water, immediately covering the said surface to a depth of the order of one inch with a first aqueous liquid containing a water-soluble alginate, in a concentration between 30 milligrams and 2.5 grams per litre of the suspending liquid, and at least one electrolyte which is incapable of reacting with the alginate to produce a compound insoluble in water, said electrolyte being present in a concentration of 5 to 20 millimols per litre of the suspending liquid, introducing into said liquid a concentrated suspension of said luminescent powder at a concentration between 10 and 100 gms. per litre in a second aqueous liquid, containing the same water-soluble alginate as that contained in the said first aqueous liquid, in a concentration such that the concentration of the alginate in the total suspending liquid is between 30 milligrams and 2.5 grams per litre, allowing the resulting suspension to settle for one to two hours for the deposition of a layer of the luminescent powder on to the said surface, removing the supernatant suspending liquid from the deposited layer of luminescent powder, and drying the said layer.

14. A method according to claim 11 wherein the said second aqueous liquid is pure water.

15. A method according to claim 11 wherein the second aqueous liquid contains blood serum at a concentration of 0.1 gm. per litre.

16. A method according to claim 11 wherein the said second aqueous liquid contains a water-soluble alginate.

17. A method according to claim 11 wherein said second aqueous liquid contains trisodium phosphate at a concentration between 10 and 100 milligrams per litre.

18. A method of forming upon a glass surface a luminescent screen composed of crystalline inorganic luminescent powder which is substantially insoluble in water and which consists substantially of particles not larger than 30 microns in diameter, which method comprises the steps of depositing a layer of said powder upon said surface by sedimentation from a suspension of the powder in an aqueous suspending liquid containing in solution a water-soluble alginate in a concentration between 30 milligrams and 2.5 grams per litre of the suspending liquid, and at least one electrolyte which is incapable of reacting with the alginate to produce a compound insoluble in water, said electrolyte being present in a concentration of 5 to 20 millimols per litre of the suspending liquid, removing the supernatant suspending liquid from the deposited layer of luminescent powder, drying the said layer, washing the dried layer with distilled water at a temperature of about 40° C., and again drying the said layer.

19. A method of forming upon a glass surface a luminescent screen composed of crystalline inorganic luminescent powder which is substantially insoluble in water and which consists substantially of particles not larger than 30 microns in diameter, which method comprises the steps of depositing a layer of said powder upon said surface by sedimentation from a suspension of the powder in an aqueous suspending liquid containing in solution a water-soluble alginate in a concentration between 30 milligrams and 2.5 grams per litre of the suspending liquid, and at least one electrolyte which is incapable of reacting with the alginate to produce a compound insoluble in water, said electrolyte being present in a concentration of 5 to 20 millimols per litre of the suspending liquid, removing the supernatant suspending liquid from the deposited layer of luminescent powder, drying the said layer, washing the dried layer with an aqueous solution of a calcium salt, and again drying the said layer.

20. A method of forming upon a glass surface a luminescent screen composed of crystalline inorganic luminescent powder which is substantially insoluble in water and which consists substantially of particles not larger than 30 microns in diameter, which method comprises the steps of depositing a layer of said powder upon said surface by sedimentation from a suspension of the powder in an aqueous suspending liquid containing in solution a water-soluble alginate in a concentration between 30 milligrams and 2.5 grams per litre of the suspending liquid, and at least one electrolyte which is incapable of reacting with the alginate to produce a compound insoluble in water, said electrolyte being present in a concentration of 5 to 20 millimols per litre of the suspending liquid, removing the suspending liquid from the deposited layer of luminescent powder, drying the said layer, washing the dried layer with a dilute acid which does not react with the said luminescent powder but which reacts with the alginate present in the deposited layer to liberate alginic acid, and again drying the said layer.

ERIC EDWARD WELCH.

REFERENCES CITED

The following references are of record in the file of this patent:

UNITED STATES PATENTS

| Number | Name | Date |
| --- | --- | --- |
| 2,345,255 | Gross | Mar. 28, 1944 |
| 2,376,437 | Levernz | May 22, 1945 |
| 2,435,436 | Fonda | Feb. 3, 1948 |
| 2,451,590 | Tidik | Oct. 19, 1948 |